(12) United States Patent
Ino et al.

(10) Patent No.: US 7,714,469 B2
(45) Date of Patent: May 11, 2010

(54) MOTOR AND STORAGE DISK DRIVE USING THE SAME

(75) Inventors: Yasutaka Ino, Kyoto (JP); Naoyuki Takada, Kyoto (JP)

(73) Assignee: Nidec Corporation, Kyoto (JP)

( * ) Notice: Subject to any disclaimer, the term of this patent is extended or adjusted under 35 U.S.C. 154(b) by 224 days.

(21) Appl. No.: 11/865,740

(22) Filed: Oct. 2, 2007

(65) Prior Publication Data

US 2008/0084142 A1    Apr. 10, 2008

(30) Foreign Application Priority Data

Oct. 4, 2006    (JP) .............................. 2006-272404

(51) Int. Cl.
*H02K 11/00* (2006.01)
(52) U.S. Cl. .................. 310/67 R; 310/71; 310/405
(58) Field of Classification Search ............... 310/67 R, 310/71, 254, 258, 259, DIG. 6, 405, 418, 310/425, 254.1
See application file for complete search history.

(56) References Cited

U.S. PATENT DOCUMENTS

| 4,965,476 | A | | 10/1990 | Lin |
| 5,475,274 | A | | 12/1995 | Katakura |
| 5,635,781 | A | * | 6/1997 | Moritan ........................ 310/71 |
| 6,100,612 | A | * | 8/2000 | Satoh ....................... 310/49.01 |
| 6,566,776 | B2 | * | 5/2003 | Hoffmann et al. ............. 310/91 |
| 6,753,636 | B2 | * | 6/2004 | Rehm et al. ................. 310/425 |
| 7,268,452 | B2 | * | 9/2007 | Yoshino et al. ............... 310/71 |
| 2006/0082229 | A1 | | 4/2006 | Xu et al. |

FOREIGN PATENT DOCUMENTS

| JP | 6-31358 | 4/1994 |
| JP | 07-121975 | 5/1995 |
| JP | 2813890 | 8/1998 |
| JP | 2591448 | 12/1998 |
| JP | 2000-163859 | 6/2000 |
| JP | 3103609 | 8/2000 |
| WO | 90/13167 | 11/1990 |

* cited by examiner

*Primary Examiner*—Dang D Le
(74) *Attorney, Agent, or Firm*—Volentine & Whitt, PLLC

(57) ABSTRACT

In the base bracket of the motor, the bottom-inner surface of the base bracket includes a first bottom-inner area arranged over a circuit board attaching portion of a bottom-outer surface to which the circuit board is attached, and a second bottom-inner area arranged other than the first bottom-inner area in a level axially lower than the first bottom-inner area. The second bottom-inner area defines a base of the concave portion arranged in the bottom-inner surface of the base bracket. A characteristic frequency of the disk storage device using the motor with the base bracket is preferably adjustable by changing the depth or width of the concave portion while the strength of the base bracket is preferably maintained.

10 Claims, 10 Drawing Sheets

MOTOR AND STORAGE DISK DRIVE USING THE SAME

BACKGROUND OF THE PRESENT INVENTION

1. Field of the Invention

The present invention generally relates to a motor and a storage disk device using the motor.

2. Description of the Related Art

A storage disk drive such as a hard disk drive generally includes a spindle motor for rotationally driving the storage disk(s) (such spindle motor will be simply referred to as a "motor" hereinafter), and the motor may include a bracket attached to a housing of the storage disk drive to retain the motor thereon. A wire extending from an armature of the motor leads outside of the housing and/or the bracket via a through hole arranged therein and is soldered to a flexible printed circuit board (hereinafter simply referred to as a circuit board) attached to a bottom surface of the housing and/or the bracket.

In such motor, an insulating bush member may be inserted into the through hole provided to the housing and/or the bracket to maintain the insulation between the wire, and the housing and/or the bracket. The Japanese Examined Patent Application No. 3103609 describes a motor in which an insulating ring integrally formed with a bush to be inserted into a through hole is arranged axially below the armature. In general, as described in the Japanese Examined Patent Application No. 3103609, the housing and/or the bracket of the motor includes a recess on the bottom-outer surface, in which a portion of the bottom-outer surface is axially upwardly indented, to prevent the circuit board attached to the housing and/or the bracket from axially protruding the bottom-outer surface of the housing and/or the bracket.

Meanwhile, it is not desirable for an electric device with the motor to have a specific characteristic frequency. For example, in a storage disk drive such as a hard disk drive, it is not desirable that the storage disk drive has the characteristic frequency (Hz) which is a multiple of the number of revolutions per second of the data storage disk. The characteristic frequency of the electric device may be adjustable by changing the thickness of the casing of the electric device, but changing the design of the casing will cost a lot for such as renewing the dies used for manufacturing the casing. Further, to change the design of the casing may require changing the design of the other parts.

SUMMARY OF THE INVENTION

In order to overcome the problems described above, preferred embodiments of the present invention provide a base member of a motor used for an electric device such as storage disk drive. The base member according to the preferred embodiments of the present invention has a structure facilitating to change a characteristic frequency of the electric device in a less expensive manner.

According to a preferred embodiment of the present invention, a base member used for a motor rotatable about a center axis and having an armature arranged above the base member is provided. The base member includes a bottom base portion extending in a radial direction, having an axially lower surface and an axially upper surface to axially oppose a lower surface of the armature. The axially lower surface includes a circuit board attaching portion to which a circuit board is to be attached, at which a portion the axially lower surface is axially upwardly indented such that the circuit board do not axially downwardly protrude from the other portion of the axially lower surface. The axially lower surface further includes a hole axially penetrating the bottom base portion and arranged in the circuit board attaching portion, through which a wire from the armature is to be led to the circuit board. The axially upper surface includes a first area arranged over the circuit board attaching portion and a second area arranged at an axially lower than the first area.

According to another preferred embodiment of the present invention, the axially lower surface of the bottom base portion of the base member includes a circuit board attaching portion to which a circuit board is to be attached, at which a portion the axially lower surface is axially upwardly indented such that the circuit board do not axially downwardly protrude from a radially outer rim of the other portion of the axially lower surface, a hole axially penetrating the bottom base portion and arranged in the circuit board attaching portion, through which a wire from the armature is to be led to the circuit board, and a concave portion arranged in the other area of the axially lower surface at a radially inside of the radially outer rim of the other portion.

According to the preferred embodiments of the present invention, the characteristic frequency of the storage disk drive can be preferably changed while the strength of the base member is preferably maintained.

Further, the weight of the base member can be reduced while the strength of the base member is preferably maintained.

Other features, elements, processes, steps, characteristics and advantages of the present invention will become more apparent from the following detailed description of preferred embodiments of the present invention with reference to the attached drawings.

DETAIL DESCRIPTION OF THE PREFERRED EMBODIMENT

Figure 1:
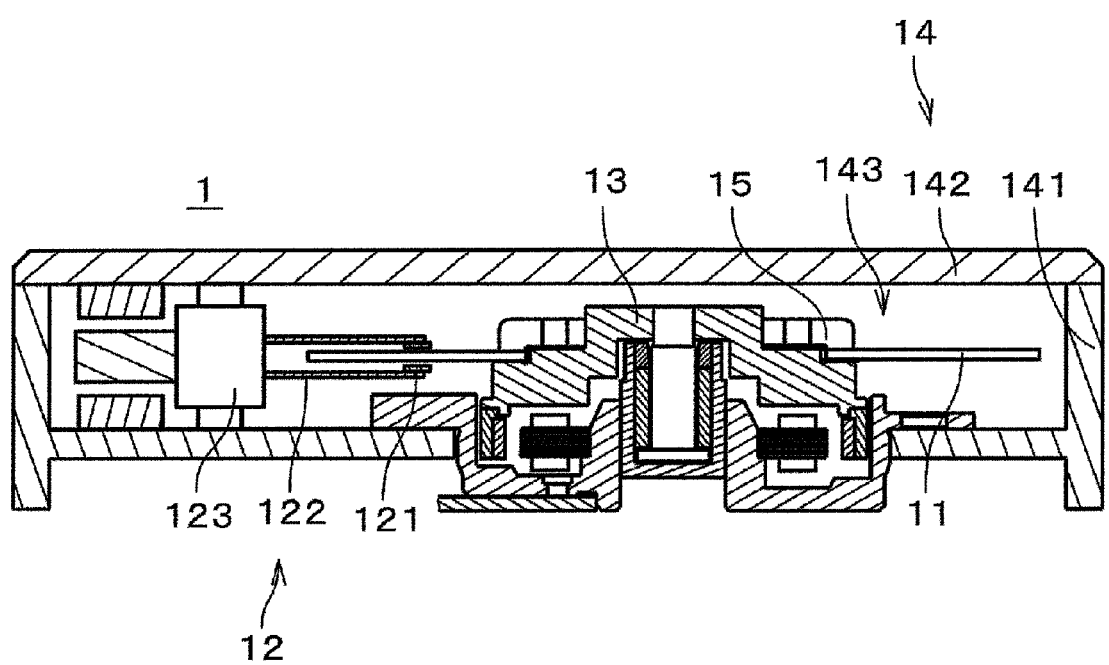
FIG. 1 is a cross sectional view illustrating a storage disk drive according to a first preferred embodiment of the present invention.

FIG. 1 is a cross sectional view illustrating an internal configuration of a storage disk drive 1 having an electrically powered spindle motor (simply referred to as "motor" hereinafter) according to a first preferred embodiment of the present invention. The storage disk drive device 1 is a hard disk device and includes a data storage disk 11 which stores information, an access unit 12 which writes information onto and (or) reads information from the storage disk 11, the motor 13 which retains and spins the data storage disk 11, and a housing 14 which has an interior space 143 accommodating the storage disk 11, the access unit 12, and the motor 13.

As illustrated in FIG. 1, the housing 14 is defined with a first housing member 141 having an box shape with an opening in the upper portion thereof and a bottom to which the motor 13 and the access unit 12 are attached, and a plate-like second housing member 142 that by covering the opening in the first housing member 141 defines the interior space 143. In the storage disk drive device 1, the housing 14 is formed by joining the second housing member 142 to the first housing member 141, whereby the interior space 143 is a clean chamber where the presence of dust and debris is extremely low.

The data storage disk 11 is set onto the motor 13 and retained there to by a clamp 15. The access unit 12 includes a head 121 that adjoins the data storage disk 11 for magnetically writing information onto and reading information from the data storage disk 11, an arm 122 that supports the head 121, and a head-shifting mechanism 123 that by moving the arms 122 varies the position of the head 121 relative to the data storage disk 11. Through the configuration of these components, the head 121 accesses required positions on the spinning data storage disk 11 when the heads have been brought adjacent to the data storage disk 11 to conduct the reading and writing of information onto the data storage disk 11.

Figure 2:
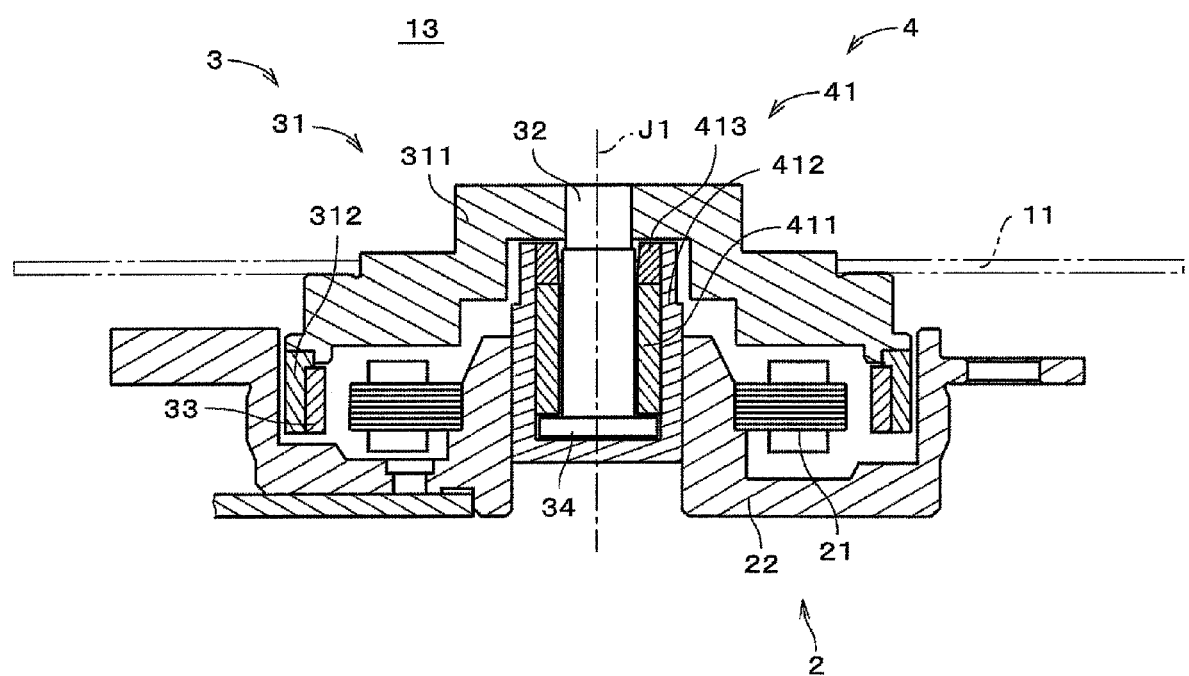
FIG. 2 is a cross sectional view illustrating a motor according to the first preferred embodiment of the present invention.

FIG. 2 is a vertical sectional view illustrating the motor 13 on which the data storage disk 11 is mounted (the data storage disk 11 is illustrated by double dot chain lines). As illustrated in FIG. 2, the motor 1 is an inner rotor type motor, and includes a stator unit 2 and a rotor unit 3. The rotor unit 3 is supported via a bearing mechanism 4 that uses hydrodynamic pressure provided by lubricant oil (i.e., a fluid dynamic bearing (FDB)) such that the rotor unit 3 is rotatable relative to the stator unit 2 around a center axis J1 of the motor 1. For convenience in the following explanation, the rotor unit 3 side of the motor 1 will be described as an upper side and the stator unit 2 side as a lower side, but the center axis J1 need not necessarily coincide with the direction of gravity.

The rotor unit 3 includes a rotor hub 31 which supports the data storage disk 11 and the various parts defining the rotor unit 3, a shaft 32 which extends axially downwardly from the rotor hub 31 and has a substantially columnar shape centered on the center axis J1, and a magnet 33 attached to the rotor hub 31 and encircling the center axis J1. The magnet 33 is a circular multipolar magnet and generates a rotational force (torque) centered on the center axis J1 between itself and the armature 24.

The rotor hub 31 includes a hub body 311 having a discoid shape, radially outwardly extending, with respect to the center axis J1, from the upper end portion of the shaft 32, and the substantially cylindrical yoke 312 extending downward along the radially outer rim of the hub body 311. The magnet 33 is arranged at radially inside of the yoke 312.

The hub body 312 is made of Aluminum, Aluminum array and the like and includes a disk placing portion on which the data storage disk 11 is to be placed. The yoke 312 is made of ferromagnetic material (e.g., stainless metal). The shaft 32 is also made of the ferromagnetic material such as stainless steel, and the upper end portion thereof is integrally fitted in a through hole centered on the center axis and axially penetrating the hub body 311. A substantially discoid thrust plate 34 is attached to a lower end portion of the shaft 32.

The stator portion 2 includes the armature 24 generating the torque by interacting with the magnet 33 and a base bracket 22 which is a base member for retaining various parts defining the stator portion 2 (e.g., the armature 33).

The bearing mechanism 4 includes a sleeve unit 41 inserted into a through hole centered on a center axis and axially penetrating the base bracket 22 and secured to the base bracket 22 with an adhesive. The sleeve unit 41 includes a sleeve 411 having a substantially cylindrical shape in which a shaft 32 is inserted, a sleeve housing 412 having a substantially cylindrical shape whose lower end is closed and in which the sleeve 411 is accommodated, and a sealing cap 413 accommodated in the sleeve housing 222 and arranged axially upper side of the sleeve 221. The sleeve 411 is made of porous material, and the sleeve housing 222 holds the lubricant oil with which the sleeve 441 is impregnated.

In the motor 13, micro-gaps are provided: in between radially inner surfaces of the sealing cap 413 and the sleeve 411, and a radially outer surface of the shaft 32; in between an axially lower surface of the sleeve 411 and an axially upper surface of the thrust plate 34; in between a radially outer surface of the thrust plate 34 and the radially inner surface of the sleeve housing 412; and in between an axially lower surface of the thrust plate 34 and the axially upper surface of the base of the sleeve housing 412.

In the lower surface of the sleeve 411, grooves (for example, grooves in spiral form) are formed for developing in the lubricating oil pressure directed toward the center axis J1 when the rotor unit 3 spins, wherein a thrust dynamic-pressure bearing section is defined by the lower surface of the sleeve 411 and the upper surface of the thrust plate 34 opposed thereto. Additionally, grooves (for example, herringbone grooves) for developing hydrodynamic pressure in the lubricating oil are formed in upper and lower sections of the surface(s) of the shaft 32 and/or the sleeve 411 opposing each other, wherein a radial dynamic-pressure bearing section is defined by the surfaces opposing each other.

In the motor 13, because the rotor unit 3 is supported in a non-contact manner via the lubricating oil by the bearing mechanism 4, the rotor unit 3 and data storage disk 11 arranged thereon are able to spin with high precision and low noise.

Figure 3:
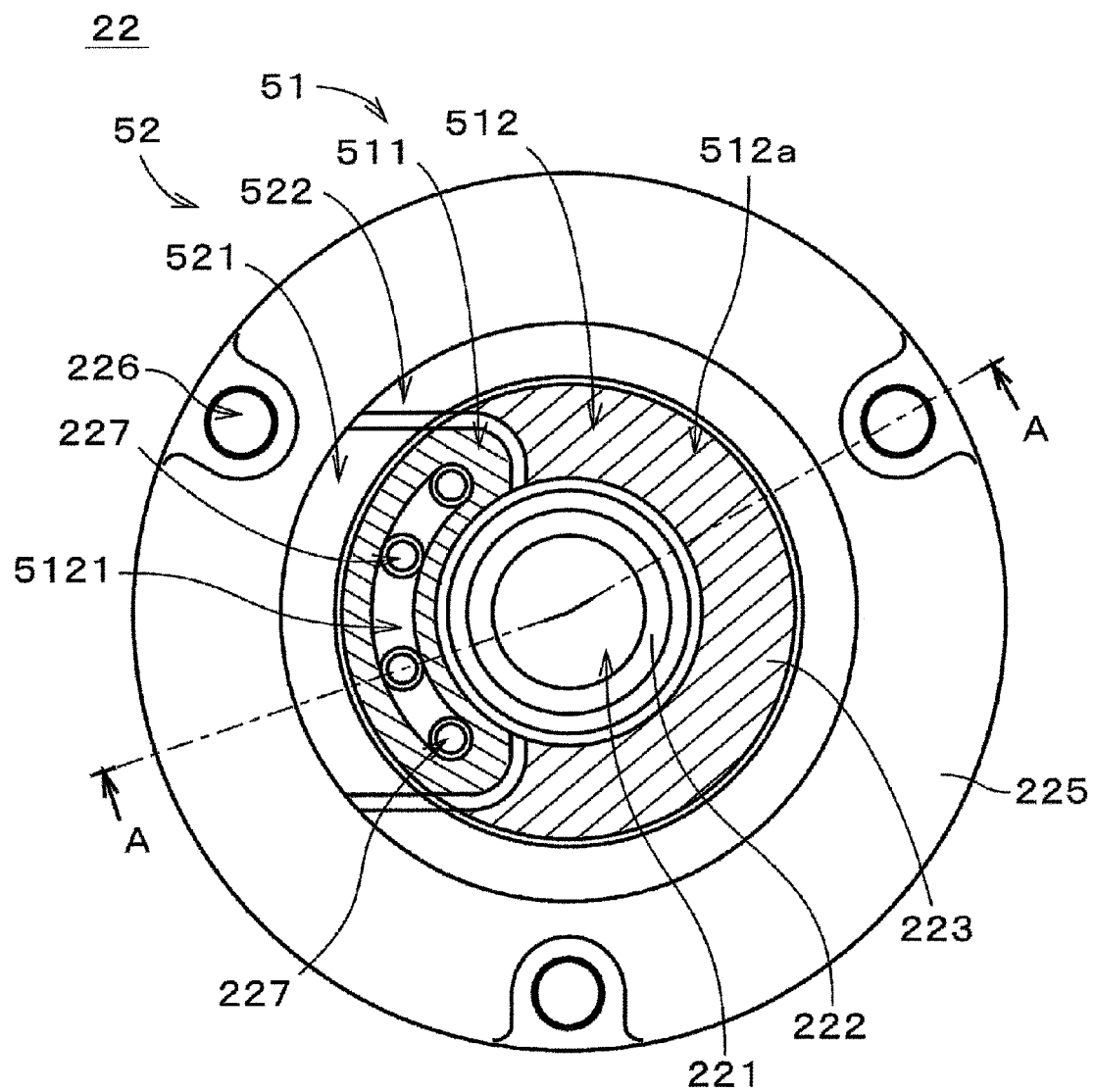
FIG. 3 is a top plan view illustrating a base bracket according to the first preferred embodiment of the present invention.
Figure 4:
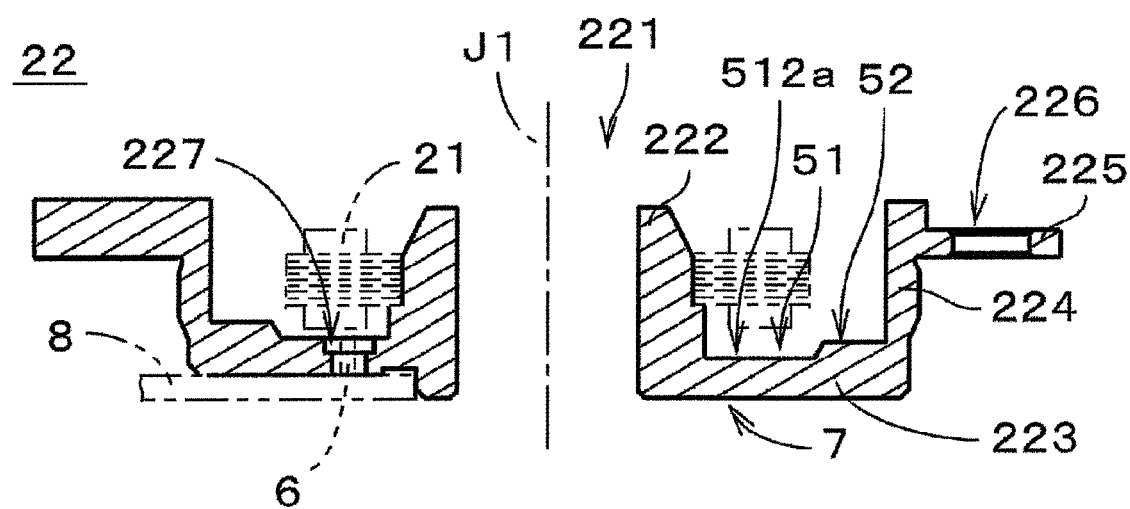
FIG. 4 is a cross sectional view illustrating the base bracket according to the first preferred embodiment of the present invention.
Figure 5:
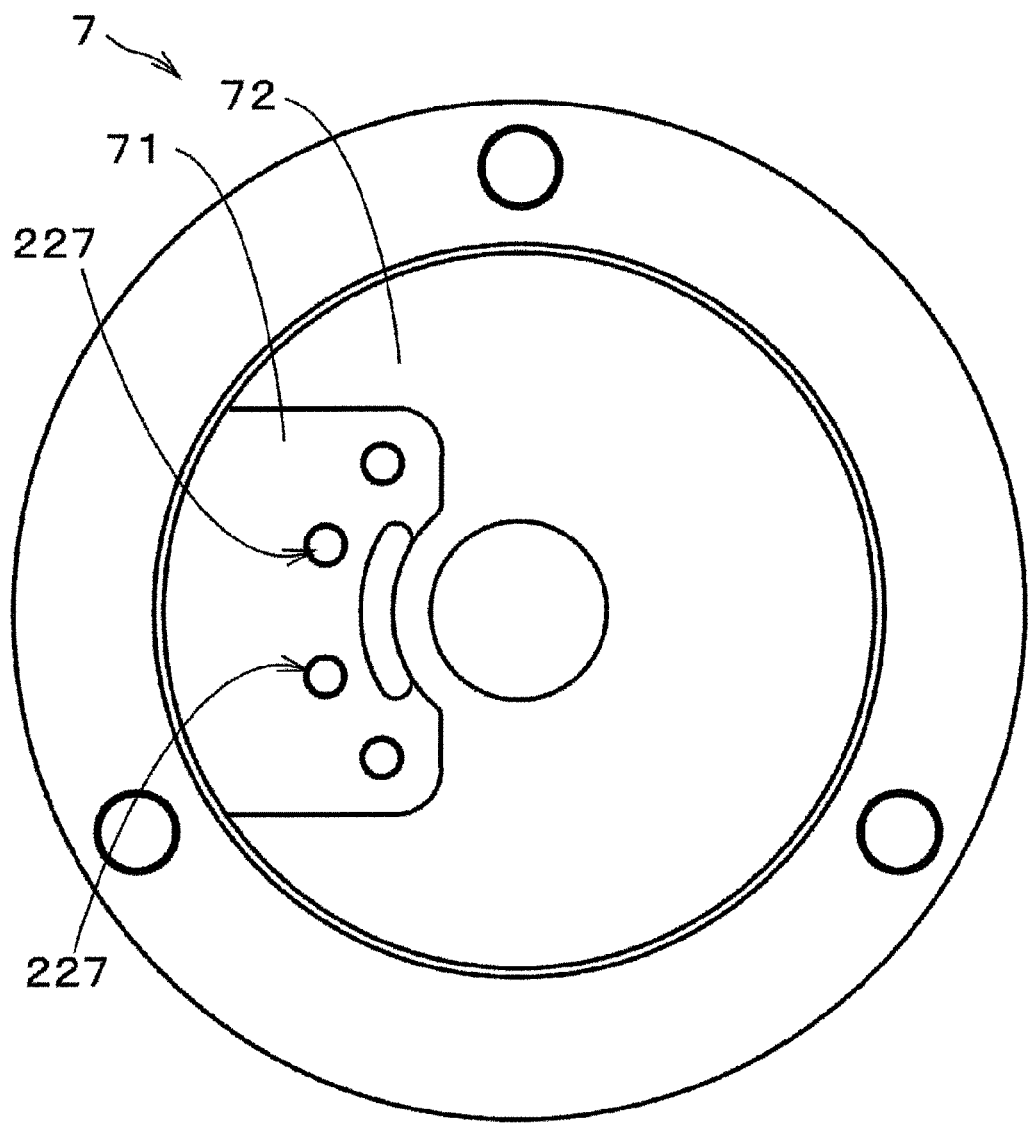
FIG. 5 is a bottom plan view illustrating the base bracket according to the first preferred embodiment of the present invention.

FIG. 3 is a top plan view illustrating the base bracket 22. FIG. 4 illustrates a cross section of the base bracket 22 along the A-A' line illustrated in FIG. 3. FIG. 5 is a bottom plan view illustrating the base bracket 22.

The base bracket 22 includes a holder portion 222 having a substantially cylindrical shape centered on the center axis J1 with a radially inner surface defining a through hole 221 in which the sleeve unit 22 is retained. The base bracket 22 further includes a bottom base portion 223, an outer cylindrical portion 224 and a flange portion 225. The bottom base portion 223 radially outwardly extends from a lower end of the holder portion 222 toward an outer cylindrical portion 224. The flange portion 225 radially outwardly extends from a radially outer surface of the outer cylindrical portion 224. The armature 21 is attached to the radially outer surface of the holder portion 222 such that an axially lower portion of the armature 21 axially opposes the bottom base 223. In the present preferred embodiment of the present invention, as illustrated in FIG. 4, the armature 21 is arranged in a recess defined with the holder portion 222, the bottom base 223, and the outer cylindrical portion 224.

As illustrated in FIG. 1, the flange portion 225 of the base bracket 22 is arranged on the first housing member 141, and is fixed thereto with a screw through a hole 226 arranged on the flange portion 225 such that an axial distance between the first housing member 141 and the data storage disk 11 is in a predetermined range.

The bottom base portion 223 includes a bottom-inner surface 51 (i.e., an axially upper surface of the bottom base portion 223) having a discoid shape and an outer peripheral surface 52 arranged radially outside of the bottom inner surface 51. The bottom-inner surface 51 is defined with two areas and these are hatched with two different hatched lines in FIG. 3. As illustrated in FIG. 4, the armature 21 is attached to the holder portion 222 such that the lower surface axially opposes the bottom-inner surface 51. The outer peripheral surface 52 is axially raised from the bottom-inner surface 51.

As illustrated in FIG. 4 by double dot chain lines, a circuit board 8 is arranged in a concave portion 71 at which a bottom-outer surface 7 of the base bracket 22 (i.e., an axially lower surface of the bottom base portion 223) is indented toward the axially upward (i.e., the bottom-inner surface 51 side) compared with the other area 72. Hereinafter, the concave portion 71 may be referred to as a circuit board attaching portion 71. The circuit board attaching portion 71 includes four through holes 227 reaching to the bottom-inner surface 51, in which bushes (i.e., insulating members) inserted. The bushes are made of insulating material, and each of the bushes has a through hole which the wire from the armature 21 passes through. An axially upper ends of the bushes are connected with an arc shape connecting portion, whereby the bushes are formed into a single piece of bush member 6. The arc shape recess 5121 is arranged in the bottom-inner surface 51, and the connecting portion of the bush member 6 is inserted in the arc shape recess 5121. Wires from the armature 21 are led to the circuit board 8 via the bushes inserted into the through holes 227 and are soldered to the circuit board 8. With the configuration, the wires are surely insulated from the base bracket 22.

In addition, with the circuit board attaching portion 71, an axially lower surface of the circuit board 8 and solders used for soldering the wires do not protrude axially below the other portion 72 of the bottom-outer surface 7, facilitating the handling of the motor 13 in manufacturing thereof.

The bottom-inner surface 51 is defined with a first bottom-inner area 511 arranged over the circuit board attaching area 71 in the axial direction and a second bottom-inner area 512 other than the first bottom-inner area 511, as illustrated in FIG. 3 with two different hatched areas. In other words, the first bottom-inner area 511, as arranged axially opposite side of the circuit board attaching portion 71 in an axially overlapping manner. The second bottom-inner area 512 is arranged at a level axially lower than the first bottom-inner area 511. In other words, the second bottom-inner area 512 is indented toward the bottom-outer surface 7, as illustrated in FIG. 4. The outer peripheral surface 52 is defined with a first outer-peripheral area 521 arranged axially above the circuit board attaching area 71 and a second peripheral area 522 other than the first outer-peripheral area 521. The second outer-peripheral area 522 is arranged axially lower than the first outer-peripheral area 521. Thus, an axially upper side of the bottom base portion 223 includes four areas arranged in axially different levels from each other.

The first bottom-inner area 511 and the second bottom-inner area 512 of the bottom-inner surface 51 are arranged axially below the armature 22. Even in case that the second bottom-inner surface 512 is arranged in an axially same level with the first bottom-inner surface 511, the second bottom-inner area 512 does not come in contact to and interfere with the armature 22. In the present preferred embodiment of the present invention, the second bottom-inner area 512 of the bottom-inner surface 51 is provided to change a characteristic frequency of the motor 13.

Figure 6:
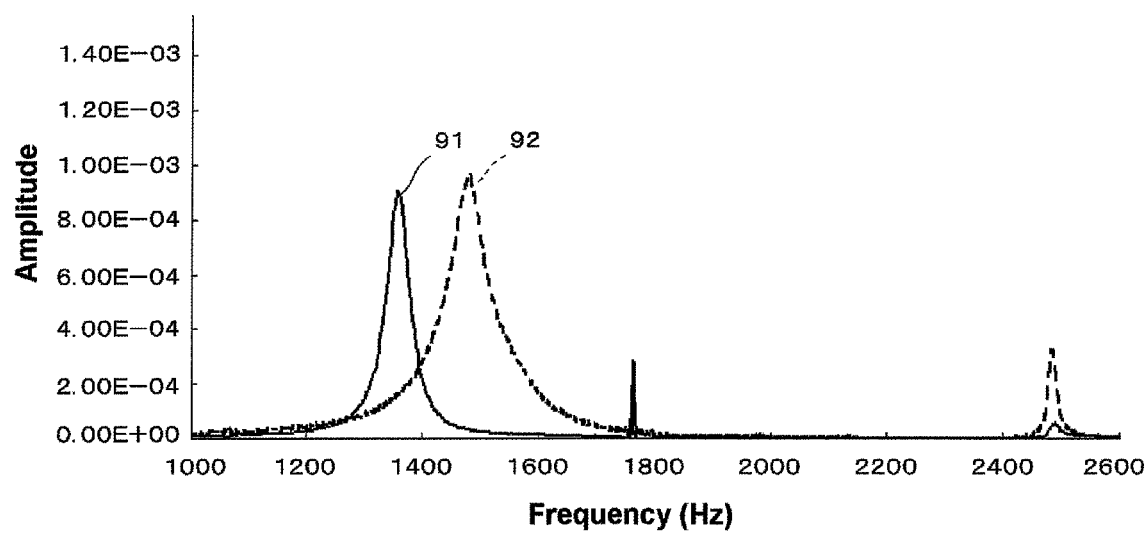
FIG. 6 is a graph showing a measurement of a characteristic frequency of the data storage disk drive.

FIG. 6 is a graph showing the characteristic frequency of the storage disk drive 1 using the motor 13 of about 1 cm axial height. The characteristic frequency of the storage disk drive 1 is measured by applying an impact from one side and measuring the vibration on the other side of the storage disk drive 1 while the motor 13 is rotated. A curve 91 shows the characteristic frequency of the storage disk drive 1 adapting the motor 13 with the base bracket 22 as illustrated in FIGS. 3 and 4. A curve 92 illustrated by a broken line shows the characteristic frequency of the storage disk drive adapting the motor with a base bracket in which the first bottom-inner area 511 and the second bottom-inner area 512 of the bottom-inner surface 51 are arranged in the same axial level (hereinafter such storage disk drive is referred to as a comparative example).

As illustrated in FIG. 6, the characteristic frequency of the comparative example is about 1500 Hz, and the characteristic frequency of the chat he storage disk drive 1 according to the preferred embodiment of the present invention is about 1350 Hz. In case that the characteristic frequency of about 1500 Hz adversely interacts with a rotational speed of the motor 13, the characteristic frequency of the storage disk drive maybe changed to adapt the configuration of the base bracket 22 illustrated in FIGS. 3 and 4, in which a concave portion 512a having a second bottom-inner area 512 as a base is provided. The characteristic frequency of the storage disk drive may be preferably adjusted by changing the width and/or the depth of the concave portion 512a. Thus, the characteristic frequency of the storage disk drive may be easily adjusted without changing the design of the motor and the storage drive disk other than the base bracket.

In case that the first bottom-inner area 511 is indented to the axially same level as the second bottom-inner area 512, the axial thickness of the base bracket 22 becomes too thin at the first bottom-inner area 511 because the circuit board attaching area where the bottom outer surface 7 is axially upwardly indented is arranged axially below the first bottom-inner area 511. In the preferred embodiment of the present invention, however, the first bottom-inner area 511 is arranged in the axially upper level than the second bottom-inner area 512, preventing the base bracket 22 from becoming partially too thin. Thereby, the characteristic frequency of the storage disk drive can be preferably changed while the strength of the base bracket 22 is preferably maintained. Especially in case that the holes 227 in which the bush member 6 is inserted is arranged in the first bottom-inner area 511, the axial thickness of the base bracket 22 does not become too thin at the first bottom-inner area 511.

As illustrated in FIG. 5, the circuit board attaching portion 71 is smaller than the other area 72 in the bottom-outer surface 7 of the base bracket 22. With the configuration, it is possible to make the concave portion 512a arranged axially above the other area 72 wider and deeper, allowing the characteristic frequency to be widely adjustable.

In the preferred embodiment of the present invention, the minimum axial thickness of the base bracket 22 at the second bottom-inner area 512 (i.e., the axial distance between the second bottom-inner area 512 and the other area 72) is within the range from about 80% to about 120% of that at the first bottom-inner area 511 other than the hole 226 and the arch shape recess 5121 (i.e., the axial distance between the first bottom-inner area 511 and the circuit board connecting portion 71). With the configuration mentioned above, it is possible to reduce the weight of the base bracket 22 while the strength of the base bracket 22 is preferably maintained.

The configuration of the base bracket 22 of the motor 13 is described above, various modifications can be made on a shape of the base bracket 22. In the above description, the bottom of the concave portion 512a (i.e., the second bottom-inner area 512) is the whole area other than the first bottom-inner area 511 of the bottom-inner surface 51, axially overlapping the circuit board attaching portion 71. However, as long as the concave portion 512a does not axially overlap the circuit board attaching portion 71, the portion of the second bottom-inner surface 512 may define the base of the concave portion 512a. The base bracket 22 described in the present preferred embodiment of the present invention may be formed by aluminum die casting or by cutting the work-in-process formed by the aluminum die casting. By forming the base bracket 22 by die casting (e.g., the aluminum die casting) or injection molding (e.g., resin injection molding and metal injection molding), the bracket 22 may be manufactured in a quick and less-expensive manner.

The first outer-peripheral area 521 and the second outer-peripheral area 522 are arranged in axially different levels in accordance with the first and the second bottom-inner areas 511 and 512. However, the first outer-peripheral area 521 and the second outer-peripheral area 522 may be arranged in the same axial level.

Figure 7:
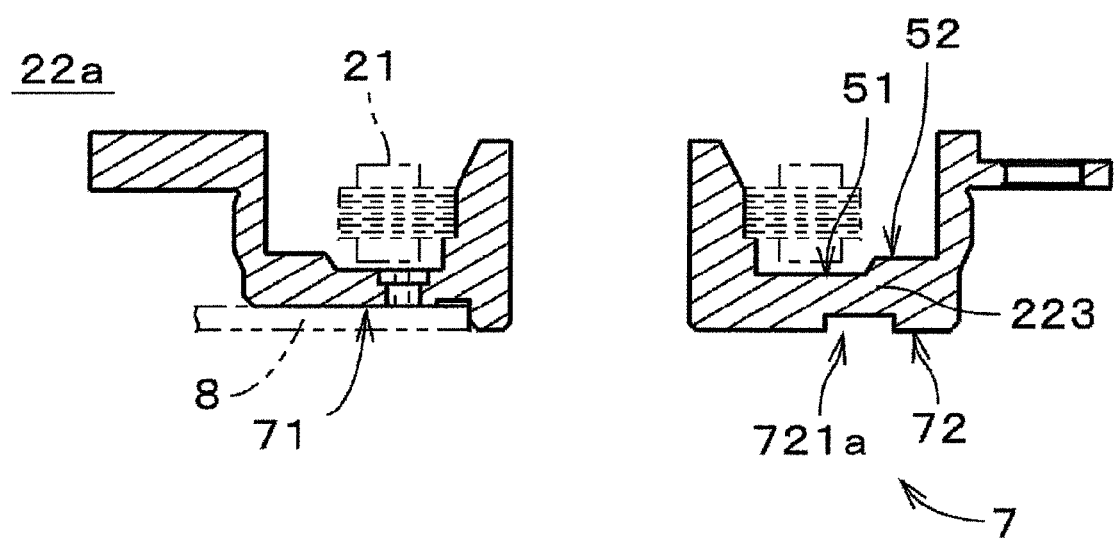
FIG. 7 is a cross sectional view illustrating the base bracket according to the second preferred embodiment of the present invention.
Figure 8:
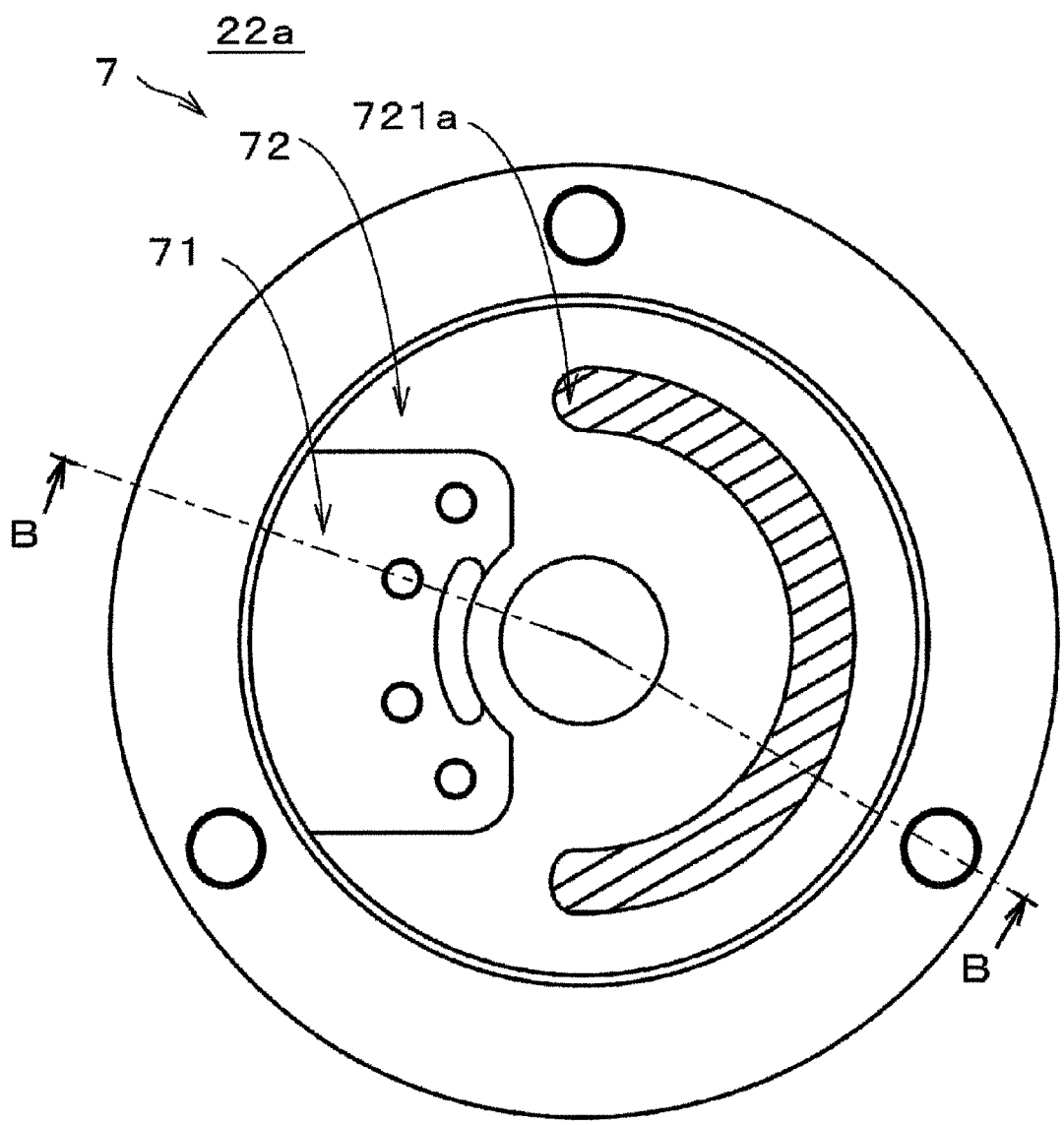
FIG. 8 is a bottom plan view illustrating the base bracket according to the second preferred embodiment of the present invention.

Next, a motor having a base bracket according to a second preferred embodiment of the present invention will be explained. The motor according to the second preferred embodiment of the present invention has a base bracket 22a having a different shape from that described in the first preferred embodiment of the present invention. The other configuration is substantially the same as that described in the first preferred embodiment of the present invention, and is labeled with the same reference numerals. FIG. 8 is a top plan view illustrating the base bracket 22a. FIG. 7 illustrates a cross section of the base bracket 22a along the B-B line illustrated in FIG. 8. As illustrated in FIG. 7, the bottom-inner surface 51 and the outer peripheral surface 52 of the base bracket 22a are plain annular surfaces unlike the first preferred embodiment of the present invention. Alternatively, the other area 72 of the bottom-outer surface 7 of the base bracket 22 includes a concave portion 721a.

As illustrated in FIGS. 7 and 8, the bottom-outer surface 7 includes the circuit board attaching portion 71 to which the circuit board 8 is attached. The circuit board attaching portion 71 is arranged at an axially upper level than the other area 72 (at least the radially outer rim of the other area 72). The concave portion 721a has a substantially arc shape arranged radially inside of the outer rim of the other area 72. In other words, a base the concave portion 721a (the surface arranged uppermost in the concave portion 721a) is surrounded with an axially downmost portion of the bottom-outer surface 7.

As described above, the characteristic frequency of the storage disk drive 1 may be adjustable while the strength of the base bracket 22a is preferably maintained by providing the concave portion 721a in the other area 72 of the bottom-outer surface 7, the area other than the circuit board attaching portion 71.

In the preferred embodiment of the present invention, the minimum axial thickness at the other area 72 (i.e., the axial distance between the second bottom-inner area 512 and the other area 72) is within the range from about 80% to about 120% of that at the circuit board attaching portion 71 other than the hole 226 and the arch shape recess 5121 (i.e., the axial distance between the first bottom-inner area 511 and the circuit board connecting portion 71). With the configuration mentioned above, it is possible to reduce the weight of the base bracket 22a while the strength of the base bracket 22a is preferably maintained.

Likewise the first preferred embodiment of the present invention, the circuit board attaching portion 71 is smaller than the other area 72 in the bottom-outer surface 7 of the base bracket 22. With the configuration, it is possible to make the concave portion 721a wider and deeper, allowing the characteristic frequency to be widely adjustable.

Figure 9:
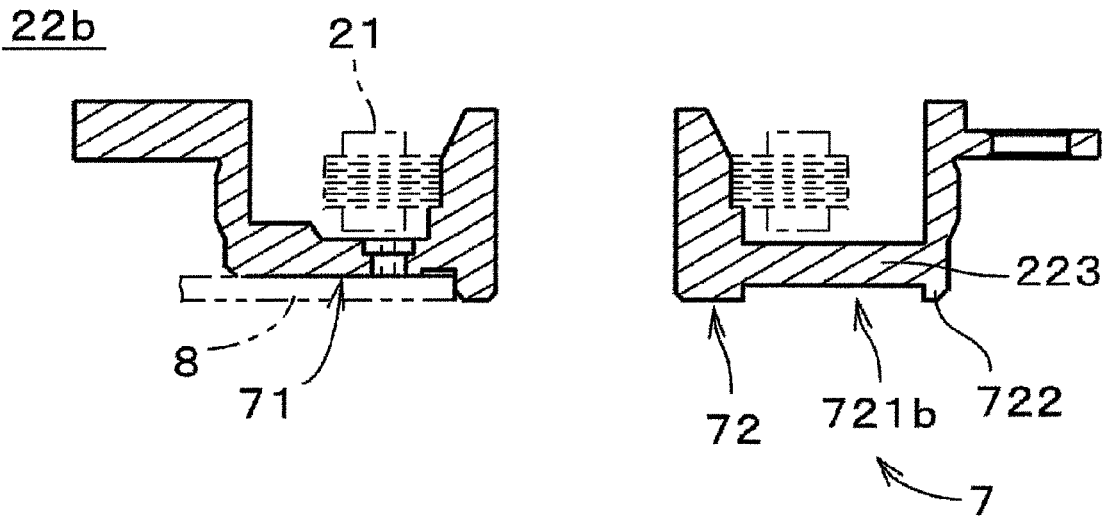
FIG. 9 is a cross sectional view illustrating the base bracket according to the variant of the second preferred embodiment of the present invention.
Figure 10:
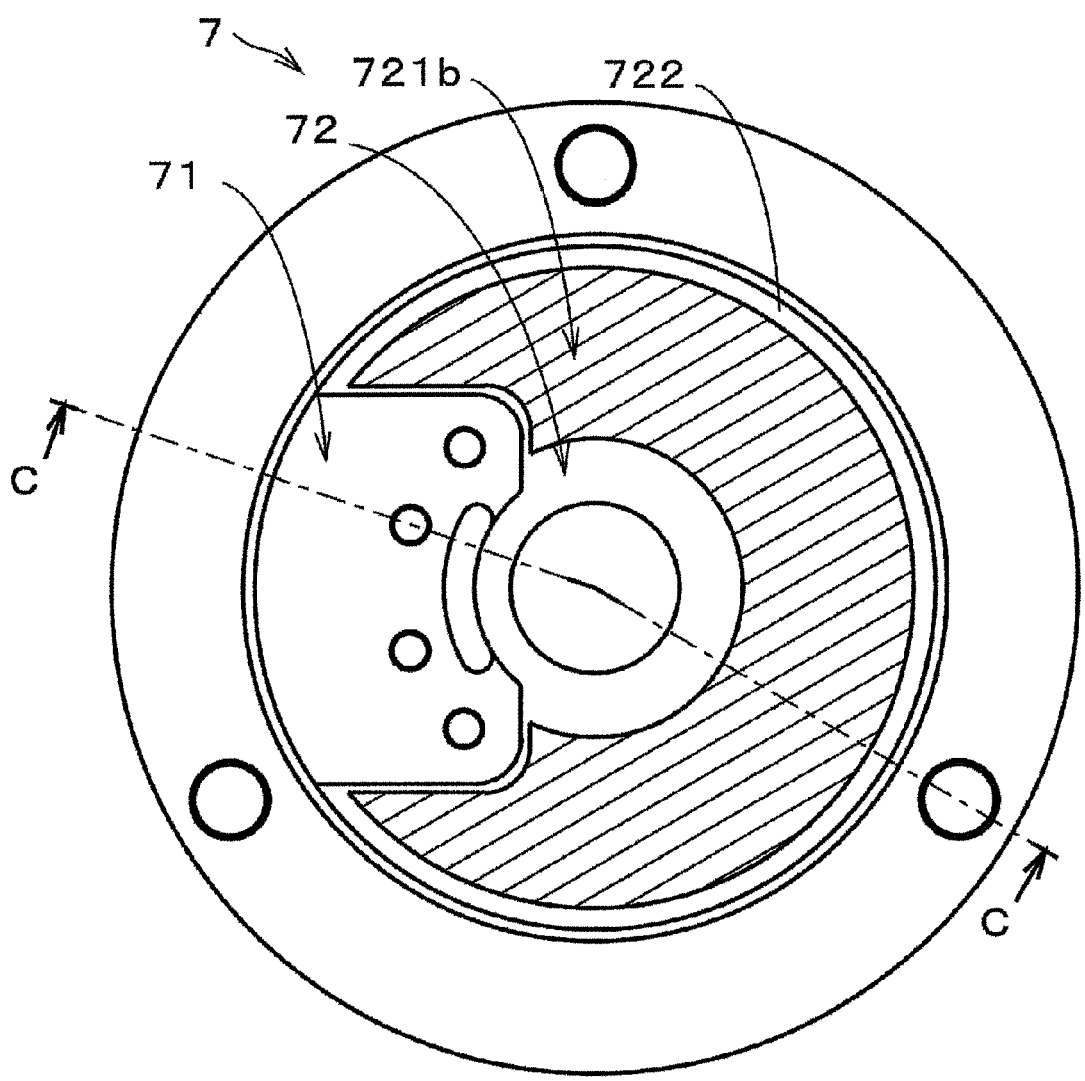
FIG. 10 is a bottom plan view illustrating the base bracket according to the variant of the second preferred embodiment of the present invention.

FIG. 10 is a top plan view illustrating the base bracket 22b according to the variant of the second preferred embodiment of the present invention. FIG. 9 illustrates a cross section of the base bracket 22b along the C-C line illustrated in FIG. 10.

In the variant of the second preferred embodiment of the present invention, the base bracket 22b has a concave portion 721b, a hatched area in FIG. 10, having a different shape from the concave portion 721a described above. The other configuration is substantially the same as the base bracket 22a described above, and labeled with the same reference numerals. The base bracket 22b has the concave portion 721b is enlarged as much as possible in a portion of the other area 72, radially inside of the outer rim of the other area 72. Thus, as illustrated in FIGS. 9 and 10, the outer rim of the other area 72 is formed into an outer frame 722. In this case as well, the circuit board attaching portion 71 axially upwardly indented from the outer rim of the other area 72.

In other words, there is provided the outer frame 722 axially downwardly protruding at the radially outer rim of the bottom-outer surface of the base bracket 22b. With the configuration, the strength of the base bracket 22b is preferably maintained. Further, the circuit board 8 attached to the circuit board attaching portion 71 (especially the portions thereof to which the wires led from the armature 21 are soldered) does not axially protrude from the axially lower end of the base bracket 22b, facilitating the handling of the motor.

While preferred embodiments of the present invention have been described in the foregoing, the present invention is not limited to the preferred embodiments described above, in that various modifications are possible.

In the preferred embodiments of the present invention, the motor 13 is mounted on the housing 14 via the base bracket 22 (22a, 22b). However, the motor 13 may be arranged directly on the first housing member 141. Specifically, the first housing member 141 may be used as the base member of the motor, and by providing the concave portion to the portion of the first housing member 141 axially opposing the armature 21, for example, it is possible to adjust the characteristic frequency of the storage disk drive 1.

The motor according to the preferred embodiments of the present invention is not necessarily of an outer rotor type in which the magnet 33 is arranged radially outside with respect to the armature 21, but may be of an inner rotor type in which the magnet 33 is arranged radially inside the armature 21. Further, the bearing mechanism 4 may be a ball bearing or any suitable bearing mechanism. The circuit board 8 may be a flexible circuit board, a rigid circuit board, and the like.

The motor 13 according to the preferred embodiments of the present invention may be used for the drive source for the various devices other than the storage disk drive.

The number of holes 227 arranged in the circuit board attaching portion 71 may be variously changed in accordance with the configuration of the motor 13.

The bush (insulating member) may have a shape different from that described above. For example, the insulating member may be an insulating sheet arranged on the first bottom-inner area.

It should be understood that variations and modifications will be apparent to those skilled in the art without departing the scope and spirit of the present invention. The scope of the present invention, therefore, is to be determined solely by the following claims.

What is claimed is:

1. A base member for use in a motor rotatable about a center axis and having an armature arranged above the base member, comprising
   a bottom base portion extending in a radial direction, the bottom base portion having an axially lower surface facing in an axially downward direction, and an axially upper surface facing in an axially upward direction opposite the axially downward direction and disposed at such a position as to face a lower surface of the armature in the axial direction,
   wherein the axially lower surface includes a circuit board attaching portion to which a circuit board is to be attached, the circuit board attaching portion of the axially lower surface being offset in the axially upward direction relative to another portion of the axially lower surface such that the circuit board will not protrude in the axially downward direction beyond said another portion of the axially lower surface,
   the bottom base portion has at least one hole extending axially therein between the axially upper surface and the circuit board attaching portion of the axially lower surface, through which wire from the armature is to be led to the circuit board, and
   the axially upper surface has a first area juxtaposed in the axial direction with the circuit board attaching portion of the axially lower surface, and a second area offset in the axially downward direction relative to the first area.

2. The base member as set forth in claim 1, further comprising a respective insulating member disposed in each said at least one hole to prevent the wire and the base member from being conductive in the at least one hole.

3. The base member as set forth in claim 2, wherein the bottom base portion also has a recess in the first area and into which the at least one hole opens, the recess being wider than the hole, and a part of the insulating member being disposed in the recess.

4. The base member as set forth in claim 3, wherein the at least one hole includes a plurality of respective holes whereby a plurality of insulating members are disposed in the holes, respectively, and further comprising an arcuate connecting portion connecting axially upper portions of the insulating members,
   the plurality of holes being arrayed in the first area along an arc centered on the center axis,
   the recess having the shape of an arc centered on the center axis and connecting the plurality of holes, and
   the connecting portion being disposed in the recess.

5. The base member as set forth in claim 1, wherein the axially upper surface of the bottom base portion further includes a peripheral portion disposed radially outwardly of the first area and the second area, the peripheral portion being offset in the axially upward direction relative to the first area and the second area.

6. The base member as set forth in claim 5, wherein the peripheral portion includes a first outer-peripheral area juxtaposed in the axial direction with the circuit board attaching portion of the axially lower surface, and a second outer-peripheral area offset in the axially downward direction relative to the first outer-peripheral area.

7. The base member as set forth in claim 1, wherein a minimum axial thickness of the base member at the second area is within a range from about 80% to about 120% of that at the first area.

8. The base member as set forth in claim 1, wherein the circuit board attaching portion is smaller than the said another area of the axially lower surface of the base member.

9. The base member as set forth in claim 1, further comprising:
   a holder portion having a radially outer surface to which the armature is to be attached and an axially lower end portion from which the bottom base portion extends in the radial direction;
   an outer cylindrical portion extending in the axially upward direction from a radially outer end of the bottom base portion; and
   a flange portion extending radially outwardly from a radially outer surface of the outer cylindrical portion.

10. A storage disk drive comprising:
   a motor including the base member as set forth in claim 1;
   a data storage disk mounted on the motor;
   an access unit writing information onto and reading information from the data storage disk; and
   a casing accommodating the motor, the data storage disk, and the access unit therein.

* * * * *